United States Patent

Seki

[11] Patent Number: 5,906,441
[45] Date of Patent: *May 25, 1999

[54] RESIN MADE CAGE FOR AN ANGULAR BALL BEARING

[75] Inventor: Shinji Seki, Toyo-to, Japan

[73] Assignee: NTN Corporation, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/805,578

[22] Filed: Feb. 25, 1997

[30] Foreign Application Priority Data

Feb. 29, 1996 [JP] Japan .................................. 8-043370

[51] Int. Cl.$^6$ ...................................................... F16C 33/38
[52] U.S. Cl. ........................................... 384/528; 384/523
[58] Field of Search .................................... 384/523, 527, 384/528, 533

[56] References Cited

U.S. PATENT DOCUMENTS

| | | | |
|---|---|---|---|
| 2,665,958 | 1/1954 | Waldherr, Jr. | 384/527 |
| 4,493,513 | 1/1985 | Osawa et al. | 384/523 X |
| 4,560,291 | 12/1985 | Bonengel et al. | 384/533 |

FOREIGN PATENT DOCUMENTS

| | | | |
|---|---|---|---|
| 1026577 | 3/1958 | Germany | 384/523 |
| 2655276 | 7/1977 | Germany | 384/527 |
| 550500 | 3/1977 | U.S.S.R. | 384/528 |

*Primary Examiner*—Thomas R. Hannon
*Attorney, Agent, or Firm*—Nikaido, Marmelstein, Murray & Oram LLP

[57] ABSTRACT

The inlet diameter A of the outer side of a pocket 4*a* is larger than the diameter Dw of a ball 3 to be housed. The inner side section of the wall surface of the pocket 4*a* is drawn with a spherical surface 4*a*1 of the radius R of curvature {the dimension obtained by adding the pocket clearance (corresponding to one side) to the radius (Dw/2) of a ball 3}, the center of curvature of which is made point 0 (the intersection of the pitch circle of the ball 3 and the contact angle line L), the outer side section of the wall surface of the pocket 4*a* is drawn with a cylindrical surface 4*a*2 of the radius R of curvature having its center of curvature on the contact angle line L, and the spherical surface 4*a*1 of the inner side is smoothly continued with the cylindrical surface 4*a*2 of the outer side.

1 Claim, 3 Drawing Sheets

RESIN MADE CAGE FOR AN ANGULAR BALL BEARING

FIELD OF THE INVENTION

The present invention relates to a resin made cage to be incorporated in an angular ball bearing.

BACKGROUND OF THE INVENTION

An angular ball bearing which is illustrated as an example in FIG. 3 is of a type that both the inner ring 1 and outer ring 2 thereof have a counter-bore. A plurality of balls 3 intervene between the raceway surface 1a of the inner ring 1 and the raceway surface 2a of the outer ring 2 and are retained by a cage 4'. The straight line (the contacting angle line L) which connects the balls 3 to the raceway surfaces 1a,2a of the inner and outer rings 1,2 has a certain angle (contact angle θ) with respect to the radial direction, whereby these balls 3 are constructed so that the same are able to receive a radial load and an axial load in one direction.

The cage 4' is a molded resin (flexing molding, injection molding, etc.) made of laminated phenol resin, reinforced synthetic resin, etc., and is provided with a plurality of pockets 4'a in which the balls 3 are housed.

As enlarged and shown in FIG. 4, the wall surface of the pocket 4'a is drawn with a spherical surface 4'a1 having a radius R of curvature obtained by adding the pocket clearance (corresponding to one side) to the radius (Dw/2) with the point 0 (the intersection of the pitch circle of the ball 3 and the contact angle line L) made its center of curvature. The inlet diameter A' at the outer side of the pocket 4'a is made smaller than the diameter (Dw) of the ball 3. (That is, A'<Dw).

As shown in FIG. 5, when assembling, a cage 4' is attached to the inner ring 1, balls 3 are pressed into the pocket 4'a of the cage 4' from the outer side with both the cage 4' and the inner ring 1 laid down, whereby the balls 3 are inserted into the pocket 4'a by elastically and forcibly widening the inlet diameter A' with the balls 3.

In a conventional cage 4', since the inlet diameter A' of the pocket 4'a is made smaller than the diameter Dw of the balls 3, it is necessary to provide an insertion force F to widen the inlet diameter A' of the pocket 4'a in an insertion work of balls 3. Although this insertion force F does not constitute a large problem in a case where the bearing size is small, a comparatively large force is required if the bearing size is increased. Furthermore, unless the balls 3 are completely inserted, some of the balls 3 may be pushed out of the pockets 4'a and may be dropped out during the assembling.

SUMMARY OF THE INVENTION

As described above, conventional cages 4' have some points to be improved in view of the assembling, especially at the standpoint of inserting balls. It is therefore an object of the invention to provide such improvements.

In order to achieve the abovementioned objects, with the invention, the inlet diameter at the outer side of the pocket is made larger than the diameter of balls to be housed, in a resin made cage for an angular ball bearing which is provided a plurality of pockets to house balls and has a spherical surface corresponding to the balls at the wall surface of the pockets.

Since the inlet diameter of the outer side of pockets is made larger than the diameter of balls to be housed, no insertion force is required when inserting balls into their pockets, and the efficiency of the assembling work is further improved.

DESCRIPTION OF PREFERRED EMBODIMENT

Hereinafter, a description is given of a preferred embodiment of the invention with reference to FIG. 1 and FIG. 2. Furthermore, members and parts which are substantially the same as those in FIG. 3 to FIG. 5 are given the same reference numbers, and the overlapping description thereof is omitted.

Figure 1:
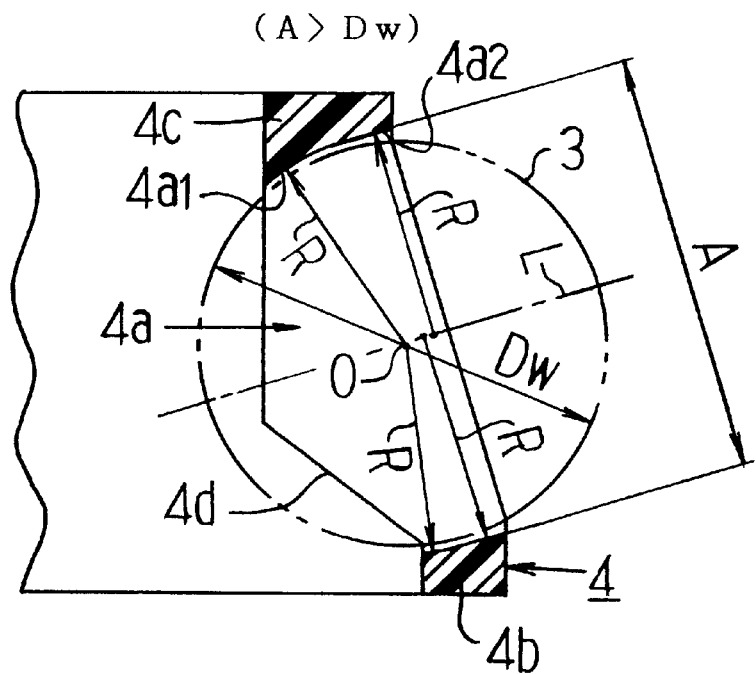
FIG. 1 is a cross-sectional view of a resin made cage according to a preferred embodiment of the invention.
Figure 3:
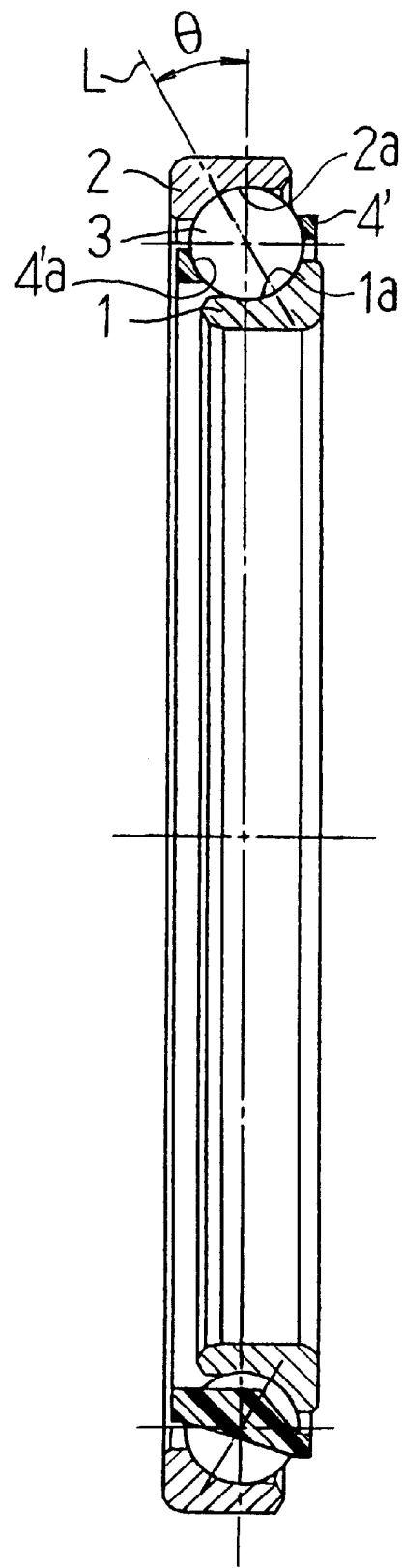
FIG. 3 is a cross-sectional view showing a construction example of an angular ball bearing.

A cage 4 illustrated in FIG. 1 is of a type which is incorporated in an angular ball bearing of such a type as shown in FIG. 3. The cage 4 is made of a synthetic resin such as laminated phenol resin, reinforced synthetic resin, etc., and is provided with a plurality of pockets 4a which are able to house balls 3. One side in the axial direction of the pockets 4a is made a large-diametered section 4b and the other side in the axial direction thereof is made a small-diametered section 4c, and they are continued via an inclined post 4d.

Figure 4:
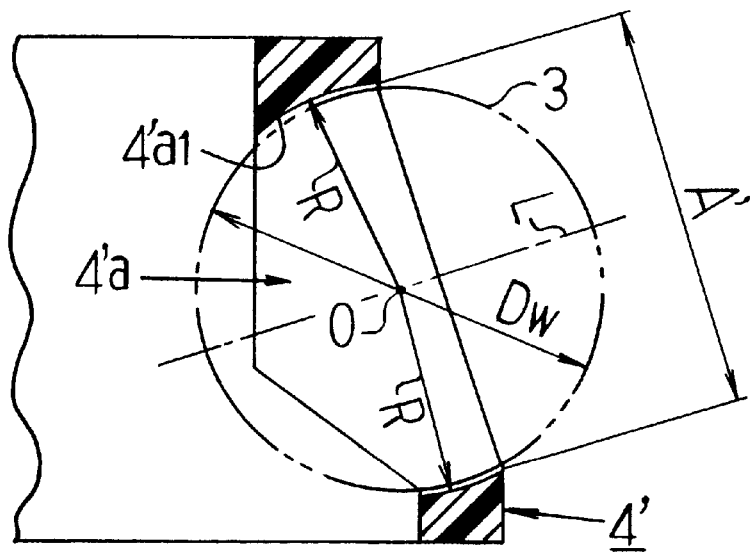
FIG. 4 is a cross-sectional view of a conventional cage.
Figure 5:
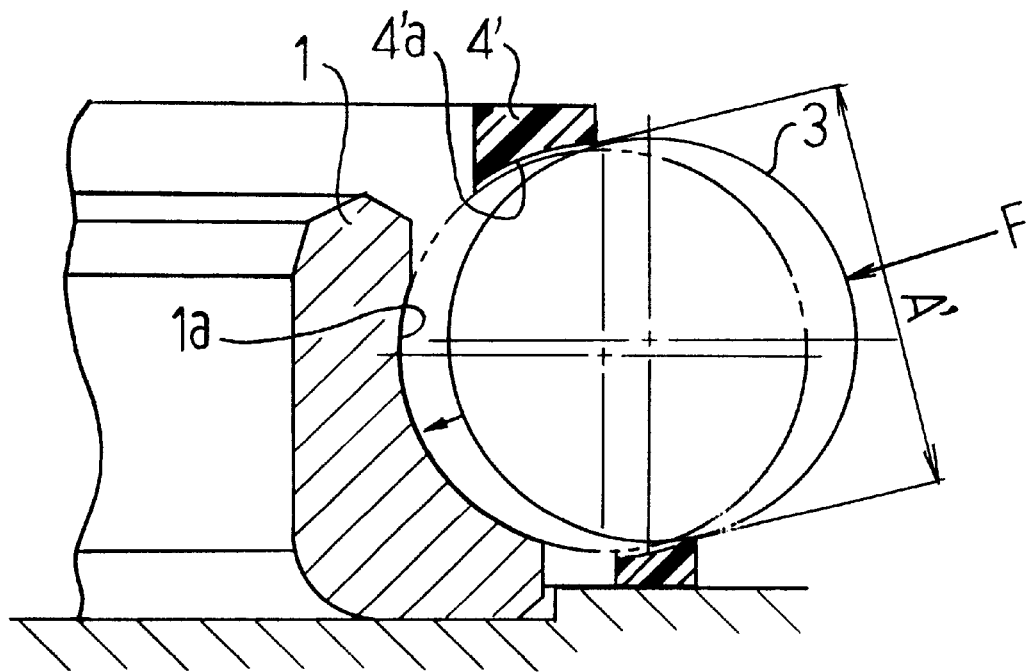
FIG. 5 is a cross-sectional view showing the inserting process in a conventional cage.

The point which a cage 4 according to this preferred embodiment is different from conventional cages 4' shown in FIG. 4 is that the inlet diameter A of the outer side of the pockets 4a is made larger than the diameter Dw of balls 3 to be housed. (That is, A>Dw).

As a means for ensuring that the inlet diameter A is larger than the ball diameter Dw, in this preferred embodiment, the inner side section of the wall surface of the pockets 4a is drawn with a spherical surface 4a1 of the radius R of curvature {the dimension obtained by adding the pocket clearance (corresponding to one side) to the radius (Dw/2) of a ball 3}, the center of curvature of which is made point 0 (the intersection of the pitch circle of the ball 3 and the contact angle line L), the outer side section of the wall surface of the pocket 4a is drawn with a cylindrical surface 4a2 of the radius R of curvature having its center of curvature on the contact angle line L, and the spherical surface 4a1 of the inner side is smoothly continued with the cylindrical surface 4a2 of the outer side.

Figure 2:
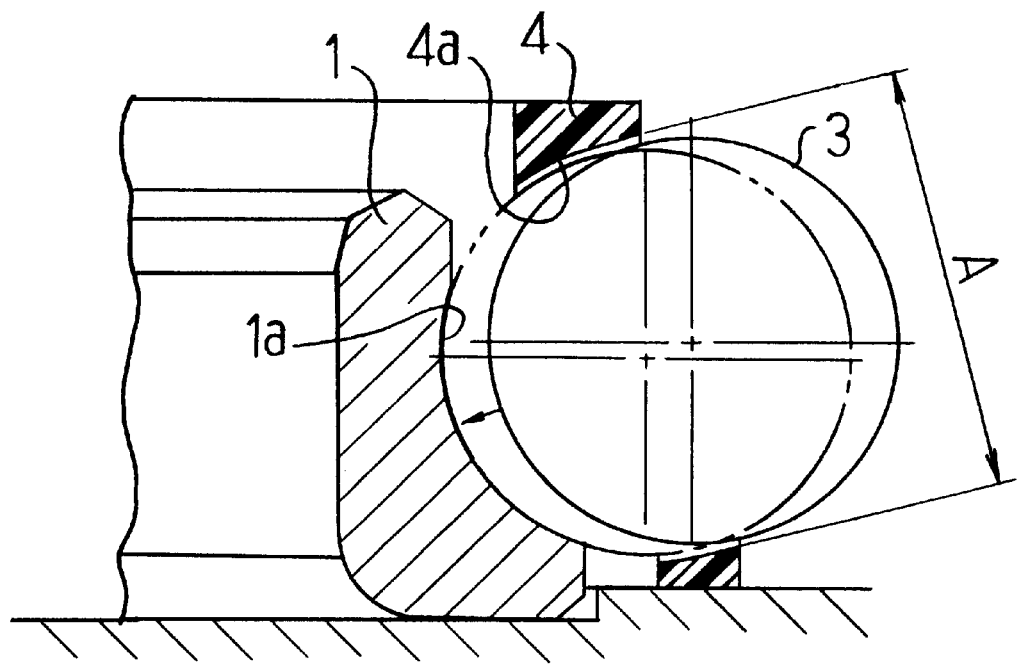
FIG. 2 is a cross-sectional view showing an insertion process of balls in a resin made cage according to the preferred embodiment of the invention.

As described above, since it is ensured that the inlet diameter A is larger than the ball diameter Dw, in this preferred embodiment, it is possible to insert balls 3 into the pockets 4a without requiring any inserting force as in the conventional construction as shown in FIG. 2.

Furthermore, as a means for ensuring that the inlet diameter A is larger than the ball diameter Dw, such a construction may be employed in addition to the abovementioned construction, where the wall surface of pockets 4a is drawn with a spherical surface having a slightly larger radius of curvature than R, using the point offset from the point 0 shown in FIG. 1 to the outer side along the contact angle line L.

I claim:

1. An angular ball bearing comprising:

an inner ring having a raceway surface, and a counter-bore at one side of the raceway surface;

an outer ring having a raceway surface, and a counterbore at another side of the raceway surface;

a plurality of balls disposed between the raceway surface of the inner ring and the raceway surface of the outer ring, the balls being in angular contact with the raceway surfaces;

a resin made cage having a plurality of open pockets for retaining the balls, a small-diametered ringed-section at the one side in the axial direction of the pockets, a large-diametered ringed-section at the another side in an axial direction of the pockets, inclined post-sections at both sides in the circumferential direction of each of the pockets, and an inlet at an outer diameter side of each of the pockets for inserting the ball into the pocket, wherein a diameter of the inlet is larger than a diameter of the ball, each of said pockets having an inner-side wall surface and an outer-side wall surface, wherein said inner-side wall surface of each pocket is spherical with a radius of curvature equal to the sum of a radius of said ball and a pocket clearance, a center point of said radius of curvature being on a point defined by an intersection of a contact angle line and a pitch circle of said balls, wherein said outer-side wall surface is cylindrical having a center axis on the contact angle line, said inner-side wall surface and said outer-side wall surface being smoothly continuous with each other, and wherein assembling of said ball bearing requires attaching the cage to the inner ring, inserting the balls through the inlet into the pockets of the cage to dispose the balls on the raceway surface of the inner ring, and attaching the outer ring to the balls to dispose the balls on the raceway surface thereof.

\* \* \* \* \*